(12) United States Patent
Kozempel et al.

(10) Patent No.: US 8,726,235 B2
(45) Date of Patent: May 13, 2014

(54) TELECOM BUSINESS-ORIENTED TAXONOMY FOR REUSABLE SERVICES

(75) Inventors: Thomas Kozempel, Sewell, NJ (US); Paul Moo, Allen, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1262 days.

(21) Appl. No.: 11/693,204

(22) Filed: Mar. 29, 2007

(65) Prior Publication Data
US 2008/0244518 A1    Oct. 2, 2008

(51) Int. Cl.
*G06F 9/44* (2006.01)

(52) U.S. Cl.
USPC .......................................... 717/120

(58) Field of Classification Search
USPC ........................................ 717/101, 102, 120
See application file for complete search history.

(56) References Cited

U.S. PATENT DOCUMENTS

| | | | |
|---|---|---|---|
| 6,601,233 B1 | 7/2003 | Underwood | |
| 7,149,734 B2 | 12/2006 | Carlson et al. | |
| 8,402,525 B1 | 3/2013 | Shah et al. | |
| 2004/0187140 A1* | 9/2004 | Aigner et al. | 719/328 |
| 2004/0242329 A1* | 12/2004 | Blackburn et al. | 463/42 |
| 2004/0266532 A1* | 12/2004 | Blackburn et al. | 463/42 |
| 2005/0262194 A1* | 11/2005 | Mamou et al. | 709/203 |
| 2006/0031225 A1* | 2/2006 | Palmeri et al. | 707/10 |
| 2007/0094256 A1* | 4/2007 | Hite et al. | 707/6 |
| 2008/0072290 A1* | 3/2008 | Metzer et al. | 726/3 |
| 2008/0082569 A1* | 4/2008 | Mansour et al. | 707/102 |
| 2008/0147487 A1* | 6/2008 | Hirshberg | 705/10 |
| 2008/0177839 A1* | 7/2008 | Chang et al. | 709/205 |
| 2008/0294794 A1* | 11/2008 | Darugar et al. | 709/238 |
| 2009/0006578 A1* | 1/2009 | Schaeck | 709/217 |
| 2010/0235445 A1* | 9/2010 | Palmeri et al. | 709/204 |

OTHER PUBLICATIONS

Heather Havenstein, *Hammering Out Web Service Links*, Computerworld, Apr. 18, 2005.
Leon Erlanger, *Verizon Goes Back to the Workbench, Convincing Developers to Embrace SOA Meant Extensive Custom Development*, InfoWorld, Nov. 7, 2005.
Christopher Koch, *Integration's New Strategy*, CIO Magazine, Sep. 15, 2005.

* cited by examiner

*Primary Examiner* — Anna Deng (57) ABSTRACT

A method, system, and computer program product for a management and development framework of shared business service assets within a common services oriented architecture strategy are provided. The framework comprises a multi-dimensional business oriented taxonomy that is aligned with organizational business services requiring software support. The framework affords advantageous placement of business service assets using a product publication schema and rapid search and discovery of business service assets through a product discovery schema. Implementation of the framework across multiple units of an organization facilitates business service asset reuse, thereby enabling a minimization of asset redundancy, reduction in business application development time and cost, and rapid market entry for organizational products.

23 Claims, 4 Drawing Sheets

TELECOM BUSINESS-ORIENTED TAXONOMY FOR REUSABLE SERVICES

BACKGROUND

Software development for organizations is traditionally carried out product-by-product with applications developed to address specific product and service needs. As a result organizations develop large libraries of custom applications targeted at particular business solutions. To manage these large libraries, companies resort to cataloging their software using metadata identifiers, such as author, date of creation, etc. These library systems enable companies to associate desirable attributes with an application. Depending on the attribute selected for association, applications directed to similar subject matter may be identified with differing attributes. A consequence of this structure is repetitive and redundant software applications within the same organization. Further, should a developer wish to search the library for a particular application, knowledge of the metadata attributes associated with the application must be known in order to effectively retrieve the application. Additionally, use of metadata is limited in its ability to distinguish the purpose and or business value of any particular application. Metadata does not help determine the relationship between different applications, nor does it shed light on an application's applicability in a specific business processing area or context. Thus, organizations accumulate a plethora of software services with no efficient awareness of an application's location nor the function it provides.

Recent empirical studies indicate that software programs directed to core business functions can be implemented as many as 30 times across different applications. This represents tremendous inefficiency and cost both in development and maintenance of these redundant systems. Accordingly, what is needed is an efficient tool to assist developers and users of software assets that enables rapid search and retrieval of business software solutions, while providing a platform to minimize redundancy.

BRIEF DESCRIPTION OF THE DRAWINGS

The accompanying figures depict certain illustrative embodiments and may aid in understanding the following detailed description. The embodiments depicted are to be understood as exemplary and in no way limiting of the overall scope of the invention. The detailed description will make reference to the following figures, in which.

Throughout the drawings, like reference numbers refer to like elements, features, and structures.

DETAILED DESCRIPTION OF PREFERRED EMBODIMENTS

The matters exemplified in this description are provided to assist in a comprehensive understanding of various exemplary embodiments disclosed with reference to the accompanying figures. Accordingly, those of ordinary skill in the art will recognize that various changes and modifications of the exemplary embodiments described herein can be made without departing from the spirit and scope of the claimed invention. Descriptions of well-known functions and constructions are omitted for clarity and conciseness.

A large library of reusable software components, notably business service assets, requires a cataloging structure that is both aligned with an organization's business needs, and provides a proper framework to enable convenient discovery and reuse of assets when constructing new business systems. Such a system should be operable by non-technical personnel, such as business analysts, and new developers who may be technically competent but lack the organizational exposure to adequately understand the inner-workings of the company. Accordingly, the present disclosure encompasses a software solution that (a) classifies new and existing business assets; (b) facilitates locating assets that meet specific business requirements; and (c) enables reuse of business assets across organizational strategic business units, company partners, and third-party content providers.

Previous attempts at forming a cataloging structure were not developed with the aim of advantageous product positioning to facilitate rapid discovery and usage in a business-specific context. Accordingly, one focus of the present disclosure is to establish a product and service classification superstructure that helps developers (and asset "owners") properly position their products for easy discovery when users are searching for assets that are most likely to satisfy their specific objectives. As used herein, an asset or product's position refers to how users view the product within a given market, whether that market be internal or external. A "user" can be a human operator or an authorized application, that is, a subscribing program operating automatically with or without human intervention. Usage of an asset can be real-time or otherwise.

The present disclosure provides a classification superstructure that affords a dynamic and flexible implementation which does not impose a rigid standard or specific structure on the underlying published service for asset use/reuse. Assets are orchestrated to enable a high-level understanding of the relationship between categories, and may stand alone as specific components directed to a specific business solution rather than a monolithic dedicated application. The dedicated focus of some assets enables highly efficient operations, which aids in speed of development and time to market, that is, faster and more economic delivery of systems.

Experience suggests that most routinely performed important business transactions or functions number on the order of 500. Such transactions include, for example, retrieving customer information and verifying customer credit history. Accordingly, the software solution of this disclosure presents a unique multi-dimensional Telecom-specific business oriented taxonomy for use as a high-level classification scheme for a dynamic inventory of new and existing Common Business Service (CBS) components. The taxonomy comprises a Management Area, that is, a Process orientation, an Object Type, that is, a Payload orientation; and a Service Line, that is, a Product orientation. Because of the dynamic nature of the taxonomy, it can support and accommodate a high degree of service sharing and service independence, and can span all lines of business units within the organization, products, and IT assets and services.

The Process orientation is a high-level generic business function classification that is independent of the object types or service line supported. The Payload orientation is a general reference to the types of business objects exchanged in a service payload. The Product orientation is an organizational business product or service line supported by the framework of this software solution. Each orientation forms a dimension within the taxonomy. This taxonomy is business goal focused and each of the three identified dimensions includes a list of permissible categories that are process and product oriented. The categories can be extended over time and additional dimensions added as organizational needs require. This disclosure, however, will focus on the above three business-oriented dimensions of the taxonomy for purposes of explanation, but the invention is not limited to this quantity or categories.

Users can both publish and discover business service assets. Publishing involves a process under which software assets are registered with the framework and made available for search and use. Publishing enables a particular software asset to be located within the framework via user search, that is, discovery and thereby enables use of the asset within a business solution or application under development. Software assets are published according to criteria set out below. Published assets can be reused time and again.

Discovering involves a process whereby business service assets are searched for and located. Business service assets located via the discovery process are identified by an instance of the asset. That is, the physical program code of the asset remains local to the platform where it operates, such as, for example, a Java run-time environments and a logical link or address is returned to enable asset use. Business service assets are discovered according to criteria set out below. One advantage of using an instance is that changes or upgrades can be made to an asset and the change will be implemented immediately throughout the network, as opposed to having to push the upgrade to affected systems. Discovering may return instances to multiple assets from which a user can choose. Users may wish to consider management data associated with an asset to inform their selection. Management data includes information about the asset such as ownership, frequency of uses occurrence of failure, etc.

Service providers, that is, publishers, are users who seek to publish a particular business service asset to the framework. They are required to identify at least one category within at least one dimension of the taxonomy so as to associate the asset with the category and thereby facilitate future search. The association of asset and category should be in alignment with a particular business solution or strategy of the organization. In one exemplar implementation, however, publishers are required to identify at least one category in each dimension of the taxonomy.

Potential subscribers, that is, discoverers, are users who seek to locate a business service asset published within the framework. To locate an asset, discovers must identify at least one category within at least one dimension of the taxonomy so as to associate the asset with the category, then execute a search. As with publishing, the association of asset and category should be in alignment with a particular business solution or strategy of the organization. Discoverers use assets they locate to create software applications directed to a business solution or strategy. By locating and reusing existing business service assets, discoverers are relieved from having to "re-develop" assets from scratch and create wasteful redundancy. Reuse of existing software assets results in significant time and cost savings.

As discussed above, the multi-dimensional business process-oriented taxonomy presented herein addresses three dimensions: a process dimension, a payload dimension, and a product dimension. Each dimension of the taxonomy comprises one or more categories representative of organizational processes and services. Collectively, the categories address the majority of important business transactions or functions that are routinely performed within an organization. Such transactions include, for example, retrieving customer information and verifying customer credit history. When publishing or discovering, users will associate a particular business service asset with one or more categories in the dimensions to best assure that the asset is in alignment with the organization's goals and strategies.

By way of example, the following categories are illustrative of the type of categories that occur within the taxonomy. The categories are dynamic and may expand and contract to meet organizational needs. Accordingly the following list is an exemplary embodiment and should not be construed as finite or limiting.

Representative categories in the process dimension include:
   Pre-Order and Sales Order Management;
   Product, Pricing, Inventory Management;
   Supplier, Partner Management;
   Provisioning, Activation, Field Fulfillment Management;
   Financial and Asset Management;
   Customer, Workforce Management;
   Device, Element Management;
   Trouble, Test, Fault, Measurement Management
   Billing, Payment, Mediation, Fraud, Credit Management;
   Communication Process Management—Transmission, Routing Signaling, Switching State/Session; and
   General, Middleware Management—Distribution, Performance, Security Logging, Alarms.

Representative categories in the payload dimension include:
   Quotation;
   Order or Service Request;
   Order Status (includes Fulfillment, Acknowledgment);
   Network Service Record;
   Customer Service Record;
   Work Order;
   Credit Status;
   Bill (includes Invoice);
   Payment;
   Usage;
   Trouble Ticket;
   Circuit Detail;
   Product;
   Receipt;
   Person (workforce or customer identity);
   Equipment;
   Document (Standard MIME types exchanged in payload); and
   Request (transaction, process).

Representative categories in the product dimension include:
   Local Services;
   Access Services;
   Long Distance Services;
   DSL Services;
   Broadband/Optical Transport Services;
   Video/Gaming Services;
   Centrex and PBX Services;
   Internet Services;
   Equipment Services (CPE/Switches/Parts)
   Directory Services;
   Convergence and Collaboration Services;
   VOIP Services;
   Content Storage and Distribution Services (Email, Fax, Pager, File Transfer, etc.);

Wireless Services;
Security Se ices; and
Special Services.

Figure 1:
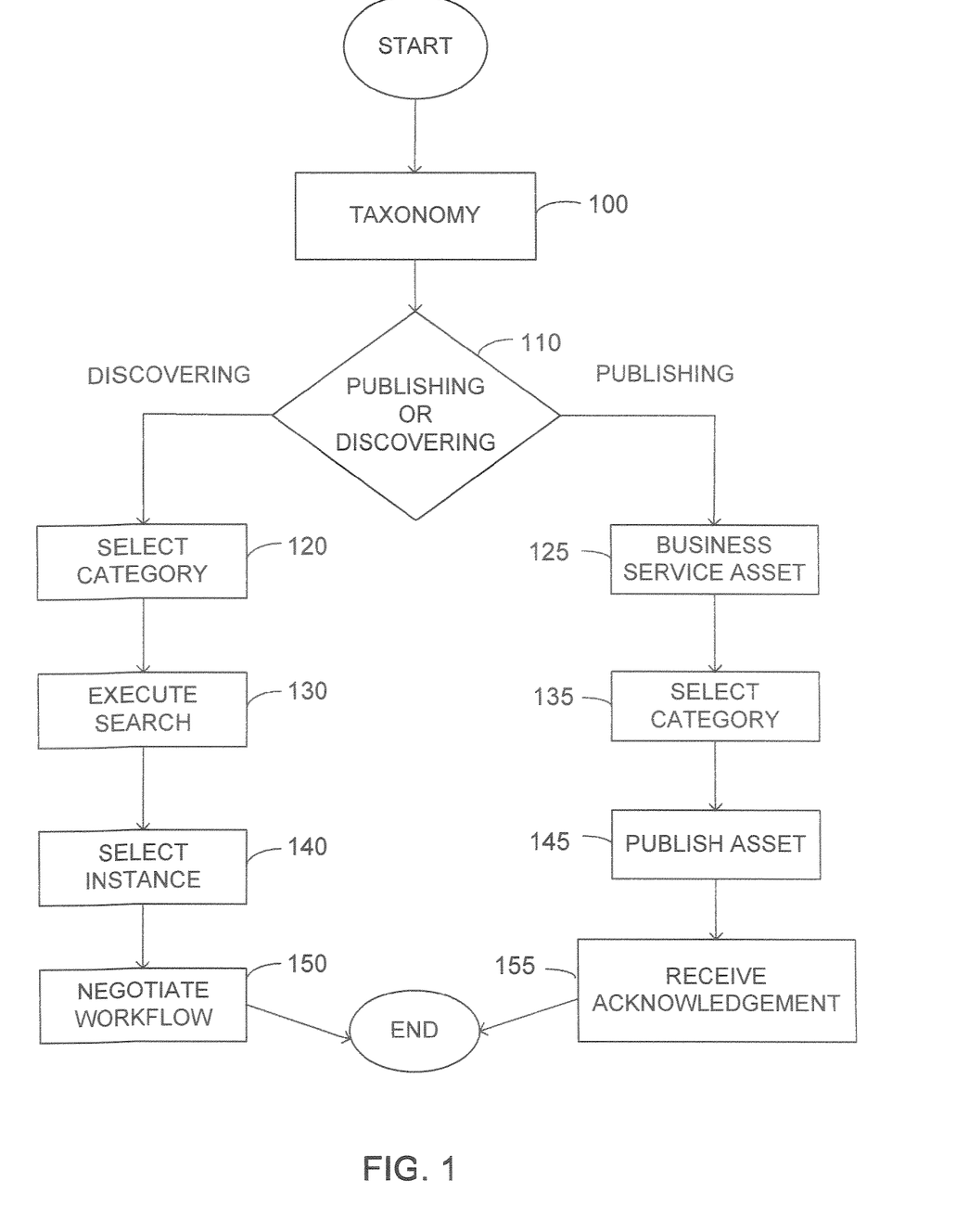
FIG. 1 is a flow chart illustrating the process flow of publishing and discovering business service assets in accordance with an exemplary embodiment.

FIG. 1 is a flow chart illustrating the process flow of publishing and discovering business service assets in accordance with an exemplary embodiment. A multi-dimensional business process-oriented taxonomy is provided within a framework, step 100. The taxonomy comprises one or more business service categories within multiple dimensions, which for discussion here comprise a process dimension, a payload dimension, and a product dimension. The categories are representative of organizational processes and services, and collectively address the majority of important business transactions or functions that are routinely performed within an organization. Such transactions include, for example, retrieving customer information and verifying customer credit history.

When publishing a business service asset, a user, that is, publisher, furnishes the asset they wish to publish, step 125, and selects one or more business service categories to associate with the asset, step 135. The categories are selected so that the categories and asset with which they are to associate are in alignment with a particular business solution or goals and strategies of the organization. The asset is then screened to ensure that it meets organizational criteria, such as quality, and if the asset qualifies it is published within the framework, step 145. An acknowledgment is sent to the user/publisher informing that the asset has been published or denied, step 155.

When discovering a business service asset, a user, that is, discoverer, selects one or more business service categories that are in alignment with the type of business service asset they seek to locate, step 120. As with publishing, the association of asset and category should be in alignment with a particular business solution or strategy of the organization. The discoverer determines which categories are selected based on criteria for the design of the business process application being developed and for which the located business service assets are to support. For example, discoverers needing to develop an application supporting customer enrollment in a new telecommunication program will want to discover business service assets that are related to credit verification, order history, payment history, usage level, etc. The discoverer then selects business service categories that will likely locate the relevant assets. Using the superstructure presented in this disclosure, discoverers can easily browse and search using the business service categories to enable them to select, collect, and orchestrate the appropriate services to meet a particular business process need, as well as the integration requirements of applications they construct.

After selecting the appropriate categories, a discoverer then executes a search to locate business service assets, step 130. To locate assets, one or more databases that store business service assets are accessed, and assets corresponding to the selected categories are identified. An instance of each located asset is returned to the discoverer for evaluation and selection, step 140. Additional criteria, such as management data, can inform the discoverers selection. Management data includes information such as asset ownership, usage volume, failure rate, etc. Assets can be selected from different environments across the computing architecture, that is, for example, environments such as .Net and J2EE. Thus, discoverers are insulated from low level criteria such as programming platform or development environment, and can then focus on selecting service assets based on relationships to core business processes and business objectives.

For each located asset that has been selected, the discoverer enters a workflow negotiation with the owner of the asset so that the asset can be used within the application, step 150. The business process application is then developed accordingly.

Figure 2:
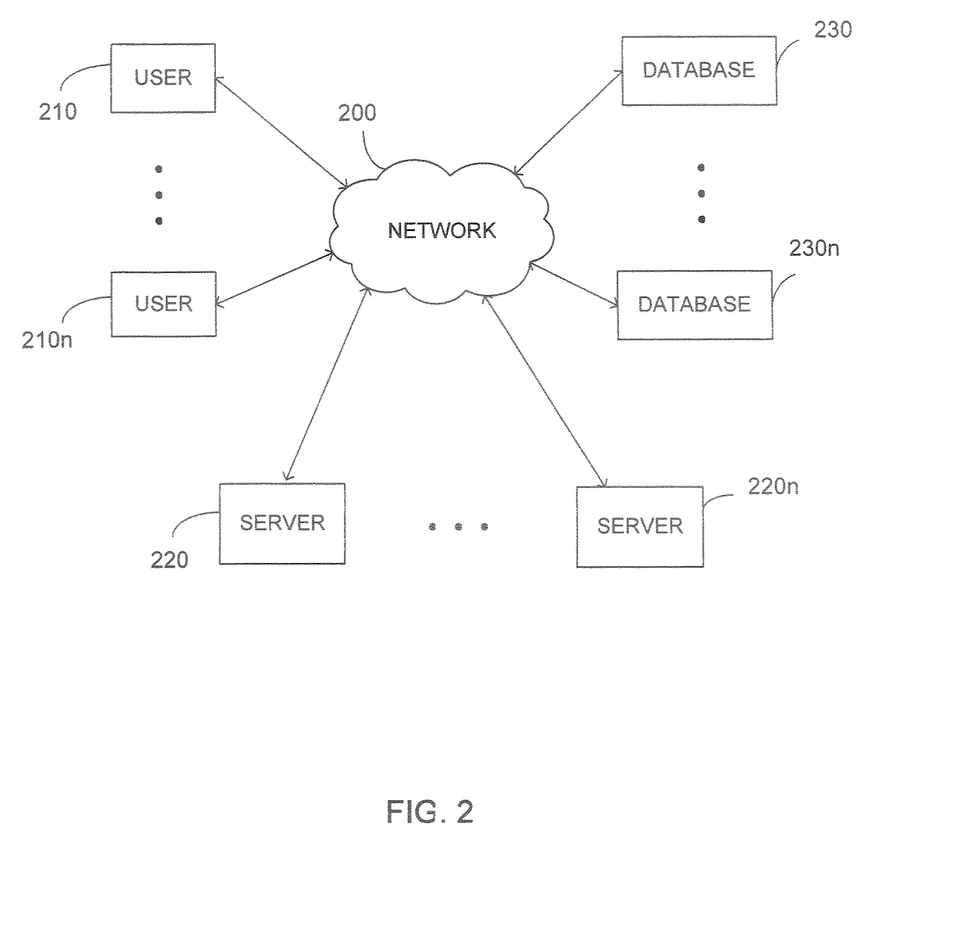
FIG. 2 illustrates an example network in which embodiments of the present system, method and computer program product may be practiced.

FIG. 2 illustrates an example network in which embodiments of the present system, method and computer program product may be practiced. One or more database systems 230 ... 230$n$ house business service asset information that has been published or otherwise prepared for use by the framework and is accessible to discoverers, where n designates the last of a plurality representing the number systems employed. Database systems 230 ... 230$n$ comprise computer data structures stored in computer memory such that a computer can manipulate the data structures to access the business service assets or their logical equivalents, such as pointers. The database systems 230 ... 230$n$ may be contained within their own discrete computer or, alternatively, located within one or more server computers 220 ... 220$n$, or even within one or more of the user computers 210 ... 210$n$. The one or more server computers communicate with the at least one database system 230 ... 230$n$ through the network 200. As with database systems 230 ... 230$n$, n designates the last of a plurality representing the number systems employed. Users can access the database systems 230 ... 230$n$ either directly or through servers 220 ... 220$n$.

In an exemplary embodiment, one or more servers 220 ... 220$n$ house a computer program product for causing publishing and discovering of business service assets in a network 200. Although shown as a discrete unit in FIG. 2, exemplary embodiments provide network 200 as encompassing one or more of database systems 230 ... 230$n$, servers 220 ... 220$n$ and user computers 210 ... 210$n$. The computer program product comprises computer readable program code for structuring a framework that includes a multi-dimensional business process-oriented taxonomy, code for business service asset publishing, and code for business service asset discovering. The computer program product can be configured to operate on one or more server computers 220 ... 220$n$, and one or more user computers 210 ... 210$n$, The publishing and discovering are performed in accordance with the process described in the discussion of FIG. 1 above.

In another exemplary embodiment, the network system of FIG. 2 further comprises an interface. The interface is operable on one or more user computers and at least one server computer. The interface comprises receiving from a publisher a business service asset with a request for publication of the asset and selection of one or more business service categories in alignment with the asset, the business service categories forming a multi-dimensional business process-oriented taxonomy within a framework. The interface additionally includes qualifying the business service asset in response to the request for publication, and, if qualified, publishing the asset. The interface further includes returning to the publisher acknowledgment that the business service asset has been published or denied, and, for discovering a business service asset, receiving from a discoverer a selection of one or more business service categories forming a multi-dimensional business process-oriented taxonomy within a framework, and a request to locate business service assets in alignment with the selected categories. The interface also comprises returning to the discoverer an instance of each business service asset located, wherein the dimensions of the taxonomy comprise a process dimension, a payload dimension, and a product dimension. The interface can be web-based. The interface can comprise a program-to-program interface or a graphical user interface (GUI).

As discussed, certain exemplary embodiments can be written as computer-readable code/instructions/programs and can be implemented in digital computers that execute the code/instructions/programs using a computer readable medium. Examples of a computer readable medium include magnetic storage media (for example, ROM, floppy disks, hard disks, among others), random-access memory (RAM), optical recording media for example, CD-ROMs, or DVDs), and storage media such as carrier waves (for example, transmission through the Internet). The computer readable medium can also be distributed over network coupled computer systems so that the computer readable code/instructions/programs is stored and executed in a distributed fashion. Further, functional programs, code, and code segments for accomplishing exemplary embodiments can be easily construed by programmers of ordinary skill.

Figure 3:
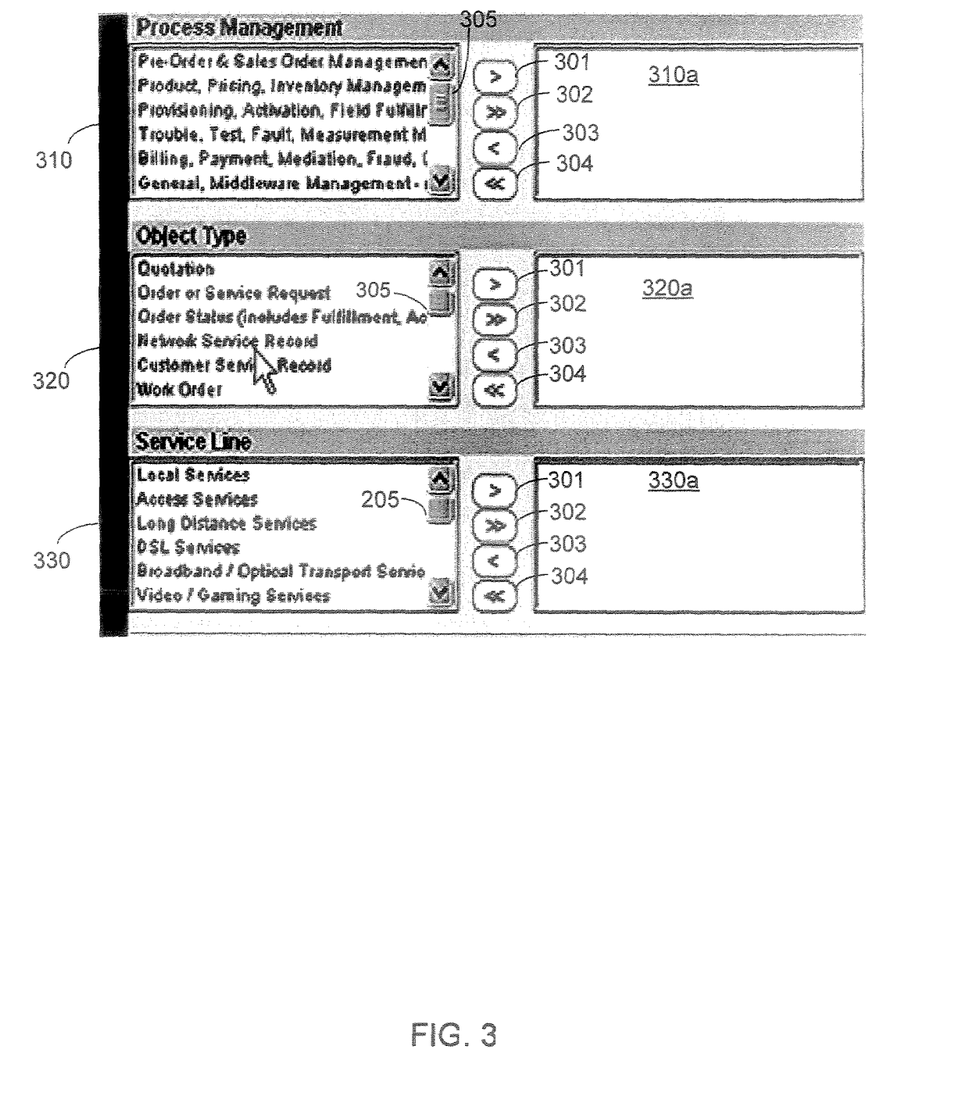
FIG. 3 illustrates an exemplary interface for publishing business service assets.

FIG. 3 illustrates an exemplary interface for publishing business service assets. In the exemplary embodiment illustrated in FIG. 3, one dimension of the multi-dimensional business process-oriented taxonomy is identified as Process Management 310, a second dimension is identified as Object Type 320, and a third dimension is identified as Service Line 330. Each dimension is shown having a selection window wherein business service categories representative of organizational processes and services are displayed.

To select a category for publishing, users identify the desired category using a pointing device, such as a mouse, then select the right-oriented arrow 301 to move the category to the appropriate selection window 310a, 320a, and 330a. This process can be repeated until all desired categories have been selected. If the majority, or perhaps all, categories are to be selected, the right-oriented double arrow 302 can be used. To de-select a category, the left-oriented arrows 303, 304 are employed. Slider 305 is used to move up and down within the category displays.

Figure 4:
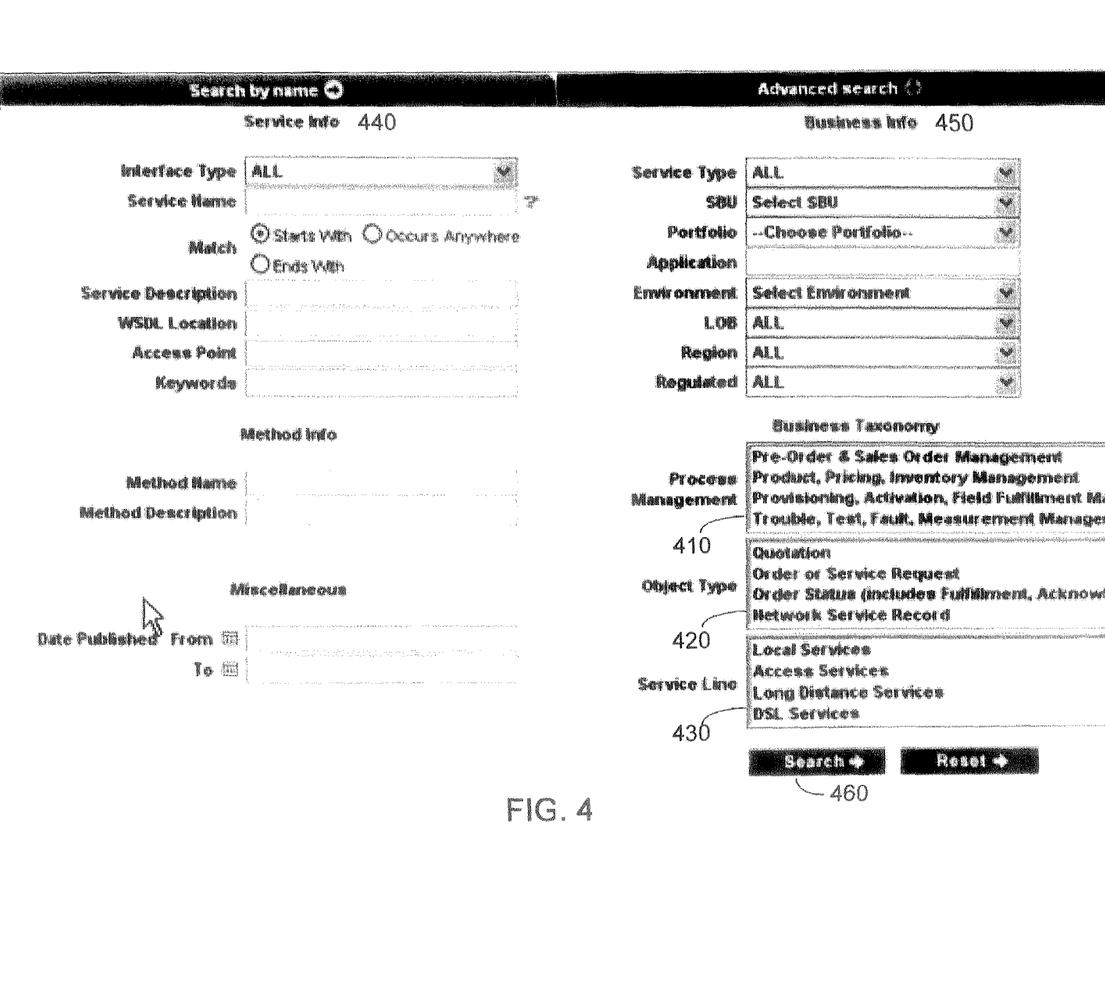
FIG. 4 illustrates an exemplary interface for discovering business service assets.

FIG. 4 illustrates an exemplary interface for discovering business service assets. In the exemplary embodiment illustrated in FIG. 4, as with FIG. 3, one dimension of the multi-dimensional business process-oriented taxonomy is identified as Process Management 310, a second dimension is identified as Object Type 320, and a third dimension is identified as Service Line 330. Each dimension is shown having a selection window wherein business service categories representative of organizational processes and services are displayed.

To select a category for discovery, users identify the desired category using a pointing device, such as a mouse. Then, when all desired categories have been selected, users select Search 460. Management data in the form of Service Info 440 and Business Info 450 can be provided to further refine the business service asset search.

While the present invention has been particularly shown and described with reference to certain exemplary embodiments thereof, it will be understood by those of ordinary skill in the art that various changes in form and detail may be made therein without departing from the spirit and scope of the present invention as defined by the appended claims and equivalents thereof.

What is claimed is:

1. A computer program product comprising a non-transitory computer readable medium having stored thereon computer readable code for causing publishing and discovering of business service assets in a network, the computer readable program code comprising:
   computer readable program code for structuring a framework comprising a multi-dimensional business process-oriented taxonomy, the taxonomy comprising one or more business service categories within at least one dimension selected from a group consisting of: a process dimension, a payload dimension, and a product dimension;
   computer readable program code for publishing a business service asset to the framework, the publishing being responsive to:
      a first user selecting from within an interface at least one of the one or more business service categories to associate with the business service asset, and
      a second user screening the business service asset to ensure that the business service asset meets organizational criteria; and
   computer readable program code for discovering the business service asset within the framework, the discovering being responsive to a third user's selection of the at least one of the one or more business service categories within the at least one dimension of the multi-dimensional business process-oriented taxonomy, the business service categories being in alignment with the business service asset.

2. The computer readable program code of claim 1, wherein the code for business service asset publishing comprises:
   computer readable program code for detecting the selection of the at least one of the one or more business service categories; and
   computer readable program code for processing a business service asset in accordance with the business service categories detected.

3. The computer readable program code of claim 1, wherein the code for business service asset discovering comprises:
   computer readable program code for detecting the selection of the at least one of the one or more business service categories; and
   computer readable program code for locating a business service asset in accordance with the business service categories detected.

4. The computer readable program code of claim 3, wherein the code for locating a business service asset comprises:
   computer readable program code for accessing a database comprising published business service assets;
   computer readable program code for locating within the database one or more business service assets corresponding to the selected at least one of the one or more of the business service categories; and
   computer readable program code for returning an instance of each located business service asset to the framework.

5. The computer readable program code of claim 4, further comprising computer readable program code for negotiating a workflow with an owner of the located business service asset to facilitate asset use.

6. The computer readable program code of claim 5, wherein asset use comprises developing a business process application.

7. The computer readable program code of claim 3, wherein the code for locating a business service asset further comprises computer readable program code for processing management data associated with the business service asset, the management data comprising asset ownership, usage volume, and failure rate.

8. The computer readable program code of claim 1, wherein the process dimension comprises one or more categories from a set comprising:

Pre-Order and Sales Order Management;
Product, Pricing, Inventory Management;
Supplier, Partner Management;
Provisioning, Activation, Field Fulfillment Management;
Financial and Asset Management;
Customer, Workforce Management;
Device, Element Management;
Trouble, Test, Fault, Measurement Management
Billing, Payment, Mediation, Fraud, Credit Management;
Communication Process Management—Transmission, Routing, Signaling, Switching, State/Session; and
General, Middleware Management—Distribution, Performance, Security, Logging, Alarms;
wherein the payload dimension comprises one or more categories from the set comprising:
Quotation;
Order or Service Request;
Order Status (includes Fulfillment, Acknowledgement);
Network Service Record;
Customer Service Record;
Work Order;
Credit Status;
Bill (includes Invoice);
Payment;
Usage;
Trouble Ticket;
Circuit Detail;
Product;
Receipt;
Person (workforce or customer identity);
Equipment;
Document (Standard MIME types exchanged in payload); and
Request (transaction, process);
wherein the product dimension comprises one or more categories from the set comprising:
Local Services;
Access Services;
Long Distance Services;
DSL Services;
Broadband/Optical Transport Services;
Video/Gaming Services;
Centrex and PBX Services;
Internet Services;
Equipment Services (CPE/Switches/Parts)
Directory Services;
Convergence and Collaboration Services;
VOIP Services;
Content Storage and Distribution Services (Email, Fax, Pager, File Transfer, etc.);
Wireless Services;
Security Services; and
Special Services.

9. A computer implemented method for publishing and discovering business service assets in a network, the method comprising:
providing a multi-dimensional business process-oriented taxonomy within a framework, the taxonomy comprising one or more business service categories within a process dimension, a payload dimension, and a product dimension;
for publishing a business service asset to the framework:
a first user providing a business service asset and selecting at least one of the one or more of the business service categories in alignment with the business service asset within at least one dimension of the multi-dimensional business process-oriented taxonomy,
a second user screening the business service asset provided by the first user to ensure that the business service asset provided by the first user meets organizational criteria; and
executing publication of the business service asset to the framework using a computer processor; and
for discovering the business service asset, receiving a third user's selection of the at least one of the one or more of the business service categories within the at least one dimension of the multi-dimensional business process-oriented taxonomy and executing a search to locate the business service asset in alignment with the selected one or more of the business service categories.

10. The method of claim 9, wherein the search comprises:
accessing a database comprising published business service assets;
locating within the database one or more business service assets corresponding to the selected one or more the business service categories; and
returning an instance of each located business service asset to the framework.

11. The method of claim 10, further comprising negotiating a workflow with an owner of the located business service asset to facilitate asset use.

12. The method of claim 9, wherein the search is further refined by specifying management data associated with the business service asset, the management data comprising asset ownership, usage volume, and failure rate.

13. The method of claim 9, further comprising:
selecting an instance of a business service asset located by the executed search; and
negotiating a workflow with an owner of the returned business service asset to facilitate asset use.

14. The method of claim 13, wherein asset use comprises developing a business process application.

15. The method of claim 9, wherein business service categories within the process dimension comprise:
Pre-Order and Sales Order Management;
Product, Pricing, Inventory Management;
Supplier, Partner Management;
Provisioning, Activation, Field Fulfillment Management;
Financial and Asset Management;
Customer, Workforce Management;
Device, Element Management;
Trouble, Test, Fault, Measurement Management
Billing, Payment, Mediation, Fraud, Credit Management;
Communication Process Management—Transmission, Routing, Signaling, Switching, State/Session; and
General, Middleware Management—Distribution, Performance, Security, Logging, Alarms;
wherein business service categories within the payload dimension comprise:
Quotation;
Order or Service Request;
Order Status (includes Fulfillment, Acknowledgement);
Network Service Record;
Customer Service Record;
Work Order;
Credit Status;
Bill (includes Invoice);
Payment;
Usage;
Trouble Ticket;
Circuit Detail;
Product;
Receipt;
Person (workforce or customer identity);

Equipment;
Document (Standard MIME types exchanged in payload); and
Request (transaction, process);
wherein business service categories within the product dimension comprise:
Local Services;
Access Services;
Long Distance Services;
DSL Services;
Broadband/Optical Transport Services;
Video/Gaming Services;
Centrex and PBX Services;
Internet Services;
Equipment Services (CPE/Switches/Parts)
Directory Services;
Convergence and Collaboration Services;
VOIP Services;
Content Storage and Distribution Services (Email, Fax, Pager, File Transfer, etc.);
Wireless Services;
Security Services; and
Special Services.

16. A system, comprising:
at least one database system for housing one or more business service assets;
at least one server computer in communication with the at least one database system; and
a computer program product, responsive to a request by one or more user computers, the computer program product comprising a non-transitory computer readable medium having stored thereon computer readable code for causing publishing and discovering of the business service assets in a network, the computer readable program code comprising:
computer readable program code for structuring a framework comprising a multi-dimensional business process-oriented taxonomy, the taxonomy comprising one or more business service categories within a process dimension, a payload dimension, and a product dimension;
computer readable program code for publishing a business service asset to the framework, the publishing being responsive to:
a first user selecting from within an interface at least one of the one or more business service categories to associate with the business service asset, and
a second user screening the business service asset to ensure that the business service asset meets organizational criteria; and
computer readable program code for discovering the business service asset within the framework, the discovering being responsive to a third user's selection of the at least one of the one or more business service categories within the at least one dimension of the multi-dimensional business process-oriented taxonomy, the business service categories being in alignment with the business service asset.

17. The system of claim 16, wherein one or more of the at least one database system is contained within one or more of the at least one server, the database system being responsive to interactions with the computer program product.

18. The system of claim 16, wherein each database system comprises a computer data structure stored in a memory of a computer configured to manipulate the data structure, the computer being responsive to interactions with the computer program product.

19. The system of claim 16, wherein the computer program product is configured to operate on the at least one server computer.

20. The system of claim 16, wherein the computer program product is configured to operate on the one or more user computers.

21. An interface comprising a non-transitory computer readable medium having stored thereon computer readable program code for publishing and discovering business service assets within a network system, the interface comprising:
for publishing a business service asset:
receiving from a publisher a business service asset with a request for publication of the business service asset and selection from within a first interface of one or more business service categories in alignment with the business service asset, the business service categories forming a multi-dimensional business process-oriented taxonomy within a framework;
in response to the request for publication of the business service asset, screening the business service asset by a screener and, if qualified, publishing the business service asset;
returning to the publisher acknowledgement that the business service asset has been published or denied; and
for discovering the business service asset:
receiving from a discoverer a user selection from within a second interface of one or more business service categories forming the multi-dimensional business process-oriented taxonomy within the framework, and a request to locate the business service asset in alignment with the selected categories;
returning to the discoverer an instance of the business service asset located, wherein the multi-dimensional business process-oriented taxonomy comprise a process dimension, a payload dimension, and a product dimension.

22. The interface of claim 21, wherein each of the first and second interfaces comprises a graphical user interface.

23. The interface of claim 21, wherein each of the first and second interfaces comprises a program-to-program interface.

* * * * *